(12) United States Patent
Slater et al.

(10) Patent No.: US 7,661,257 B2
(45) Date of Patent: Feb. 16, 2010

(54) GRASS TREATMENT APPARATUS

(75) Inventors: Tom Slater, Sheffield (GB); Jack Copeland, Sheffield (GB); John Coleman, Sheffield (GB)

(73) Assignee: Advanced Engineering Techniques Limited, Sheffield (GB)

( * ) Notice: Subject to any disclaimer, the term of this patent is extended or adjusted under 35 U.S.C. 154(b) by 368 days.

(21) Appl. No.: 11/349,057

(22) Filed: Feb. 7, 2006

(65) Prior Publication Data

US 2006/0191252 A1 Aug. 31, 2006

(30) Foreign Application Priority Data

Feb. 7, 2005 (GB) ................. 0502420.3

(51) Int. Cl.
*A01D 34/42* (2006.01)
(52) U.S. Cl. ..................................... 56/249.5
(58) Field of Classification Search ........... 56/2, 56/6, 7, 11.1, 12.6, 294, DIG. 9, DIG. 20, 56/249.5

See application file for complete search history.

(56) References Cited

U.S. PATENT DOCUMENTS

| | | | | |
|---|---|---|---|---|
| 3,056,249 A | * | 10/1962 | Shaw | ............ 56/12.6 |
| 3,901,003 A | * | 8/1975 | Erdman | ............ 56/12.6 |
| 4,015,407 A | * | 4/1977 | Bacon | ............ 56/255 |
| 4,221,499 A | | 9/1980 | Breitholz et al. | |
| 4,262,549 A | | 4/1981 | Schwellenbach | |
| 4,306,402 A | * | 12/1981 | Whimp | ............ 56/7 |
| 4,481,757 A | | 11/1984 | Tsuchiya et al. | |
| 4,601,163 A | | 7/1986 | Trelford | |
| 4,854,112 A | * | 8/1989 | Holley et al. | ............ 56/6 |
| 5,233,818 A | * | 8/1993 | Dettbarn | ............ 56/12.6 |
| 5,261,213 A | | 11/1993 | Humphrey | |
| 5,265,404 A | * | 11/1993 | Aldred et al. | ............ 56/249.5 |
| 5,412,932 A | * | 5/1995 | Schueler | ............ 56/249 |
| 5,481,857 A | * | 1/1996 | Umemoto et al. | ............ 56/12.6 |
| 6,467,245 B1 | | 10/2002 | Humphrey | |
| 2002/0157367 A1 | | 10/2002 | Oliver | |
| 2003/0177746 A1 | * | 9/2003 | Goman et al. | ............ 56/7 |

FOREIGN PATENT DOCUMENTS

| | | |
|---|---|---|
| EP | 06 250 646.4 | 11/2008 |
| GB | 2 170 390 A | 8/1986 |
| GB | 2 337 914 A | 12/1999 |
| GB | 2337914 A | 12/1999 |
| GB | 2 347 400 A | 9/2000 |
| GB | 2350998 A | 12/2000 |
| GB | 2 414 780 A | 12/2005 |
| WO | 99/07486 A1 | 2/1999 |
| WO | 01/50837 A1 | 7/2001 |
| WO | 02/076180 A1 | 10/2002 |
| WO | 03/026811 A1 | 4/2003 |

* cited by examiner

*Primary Examiner*—Thomas B Will
*Assistant Examiner*—Mai T Nguyen
(74) *Attorney, Agent, or Firm*—Harness, Dickey & Pierce, P.L.C.

(57) ABSTRACT

Apparatus for treating grass comprising a grass treatment unit 200 configured to be affixed to a grass treatment machine; a cassette 206, the cassette 206 comprising a grass treatment device 207 configured to rotate in response to a rotation of a drive shaft, the drive shaft being connected to a motor located at the grass treatment machine, the grass treatment unit 200 comprising means 211 to releasably mount the cassette 206 on the grass treatment unit 200, wherein the grass treatment device 207 is selected from a set of grass treatment devices, the set including a vibration drum.

17 Claims, 9 Drawing Sheets

GRASS TREATMENT APPARATUS

FIELD OF THE INVENTION

The present invention relates to grass treatment apparatus.

BACKGROUND TO THE INVENTION

Grass surfaces can be used for recreational purposes such as sports. Repeated use of grass surfaces can cause wear and damage to the surface, and so a turf manager charged with maintaining a grass surface must minimise the wear and damage as much as possible.

Different treatments are used to maintain grass surfaces; mowing is used to control the length of the grass, spiking is used for shallow aeration of the soil beneath the grass, scarification is used to remove thatch from the grass surface. and brushes are used to remove extraneous matter such as leaves from the surface of the grass.

All of the above types of grass treatment can be performed using grass treatment devices that have a rotating action moving over the grass surface. Typically, such grass treatment devices are mounted on a grass treatment machine such as a "triple mower". A triple mower comprises three different grass treatment units. Referring to FIG. 1 herein, there is illustrated schematically a plan view of the layout of the grass treatment units of a prior art triple mower.

The triple mower comprises a first and second grass treatment unit 101, 102 disposed adjacent to each other and towards the front of the triple mower in the direction 103 of movement. A third grass treatment unit 104 is disposed behind the pair of grass treatment units 101, 102. There is a gap 105 between the first grass treatment unit 101 and the second grass treatment unit 102. As the triple mower moves, the third grass treatment unit 104 treats the grass that was previously in the gap 105 between the first grass treatment unit 101 and the second grass treatment unit 102.

Each grass treatment unit 101, 102, 104 has a corresponding hydraulic motor 106, 107, 108 that drives a grass treating device mounted on the grass treatment unit 101, 102, 104. Each grass treatment unit also comprises a first roller 109 and a second roller 110 (illustrated on the first grass treatment unit 101 but also on the second 102 and third grass treatment unit 104).

Due to the large number of different types of grass treatments that are required, it is expensive for a turf manager to purchase and store different grass treatment units for different operations such as mowing, scarification, spiking, brushing and so on. To ameliorate this problem, it is known to use a cassette system for grass treatment units. Using the cassette system, a turf manager has a set of grass treatment cassettes. Each cassette of the set of grass treatment cassettes is releasably mountable on the grass treatment unit, and each cassette of the set of cassettes comprises a different type of grass treatment device. For example, a set of grass treatment cassettes may comprise a mowing device, a scarification device, a power brush, and a spiker. When a turf manager wishes to perform a mowing operation a mowing cassette 111, 112, 113 is mounted onto each grass treatment unit on the triple mower. If the turf manager then wishes to perform a spiking operation, each mowing cassette is removed from each grass treatment unit and replaced with a spiking cassette 114, 115, 116.

Each motor 106, 107, 108 is connected to a drive shaft 114, 115. 116 that rotates the grass treatment device of the corresponding cassette 111, 112, 113.

By using the cassette system, the costs and storage space required for maintaining the required grass treatment tools is significantly reduced. Furthermore the operation of replacing one grass treatment device with another is much simplified as a cassette is replaced in a housing of the grass treatment unit rather than replacing the entire grass treatment unit. This allows the grass treatment unit to remain fixed to the grass treatment machine whilst the cassette is replaced for a different cassette that performs a different grass treatment function.

For surfaces such as golf greens, the "speed" of the green must be controlled. This can be done by careful mowing to obtain a required grass length. However, where a fast green is required the length of the grass must be short. If grass length is very short then it can easily become distressed or diseased, thereby damaging the properties of the green. It has been found that vibration rolling can be used to increase the speed of a green whilst maintaining a longer grass length, as it flattens minor imperfections in the grass surface.

A vibration roller comprises a roller that has a vibrating mechanism associated with it. The vibrating mechanism typically consists of a rotating shaft that has an off-centre weight. It is known from U.S. Pat. No. 5,261,213 to replace an entire grass treatment unit comprising a mower of a triple mower with a vibrating drum. However, the vibrating drum operates at a speed of around 5,000 rpm whereas a mower operates at a speed of around 2,500 rpm. Gearing in the housing of the grass treatment unit is therefore required to alter the speed of revolution. The vibrating drum is in direct contact with the ground and damping is required to isolate the vibrations of the vibrating drum from the housing of the grass treatment unit. A problem associated with this system is that it is expensive and bulky to store, as a set of entire grass treatment units dedicated solely to vibration rolling must be purchased and stored in addition to separate grass treatment units for other types of grass treatment operation.

A vibration roller cannot be incorporated into known cassette mechanisms as the vibrations would propagate throughout the triple mower causing damage to each grass treatment unit and to the drive motors 106, 107, 108. Furthermore the drive motors typically operate at a speed of 2,500 rpm and this speed is insufficient to give effective vibration rolling.

SUMMARY OF THE INVENTION

The inventors have realised that It would be advantageous to provide a grass treatment unit for a grass treatment machine that uses a cassette system, and that is capable of incorporating a vibration drum cassette in addition to other types of grass treatment device cassettes.

According to a first aspect, there is provided apparatus for treating grass comprising:

a grass treatment unit configured to be affixed to a grass treatment machine;

a cassette, the cassette comprising a vibration drum, the vibration drum configured to rotate in response to a rotation of a drive shaft, the drive shaft being connected to a drive motor located at the grass treatment machine;

the grass treatment unit comprising means to releasably mount the cassette on the grass treatment unit;

the cassette further comprises means to reduce a propagation of vibrations from the vibration drum to the drive shaft.

Preferably, the cassette further comprises:

means to increase a speed of rotation of the vibration drum relative to a speed of rotation of the drive shaft.

Preferably, the means to reduce a propagation of vibrations from the vibration drum to the drive shaft comprises a flexible coupling disposed between the vibration drum and the drive shaft;

the flexible coupling being configured to absorb vibrations.

Preferably, the means to increase a speed of rotation of the vibration drum relative to a speed of rotation of the drive shaft comprises step-up gearing.

Alternatively, the means to increase a speed of rotation of the vibration drum relative to a speed of rotation of the drive shaft comprises a drive belt.

Preferably, the grass treatment unit comprises:

a first roller disposed towards the front of the grass treatment unit relative to a direction of motion;

a second roller disposed towards the rear of the grass treatment unit relative to a direction of motion;

wherein the cassette is configured to be mounted at the grass treatment unit disposed between the first roller and the second roller.

Preferably, the grass treatment unit comprises:

means to adjust a height of the first roller relative to the second roller.

Preferably, the means to adjust the height of the first roller relative to the second roller comprises a threaded bolt.

Preferably, the apparatus for treating grass as further comprises:

a spiking roller comprising a spiking roller shaft; and a set of spikes disposed on the spiking roller shaft and extending radially outwards from the spiking roller shaft, the spikes being configured to rotate about the spiking roller shaft;

means to releasably mount the spiking roller on the grass treatment unit, at a location forward of the first roller relative to a direction of motion;

Preferably, the vibration drum further comprises:

a vibration shaft configured to rotate about a main axis in response to a rotation of the drive shaft; and an offset weight attached to the vibration shaft, wherein the offset weight is configured to impart a vibration to the vibration drum in response to a rotation of the vibration shaft.

Preferably, the vibration drum is releasably affixable to said cassette.

According to a second aspect, there is provided a cassette configured to be releasably attached to a grass treatment unit, the cassette comprising:

a vibration drum, the vibration drum configured to rotate in response to a rotation of a drive shaft, the drive shaft being connected to.a drive motor located at a grass treatment machine;

means to reduce a propagation of vibrations from the vibration drum to the drive shaft.

Preferably, the cassette further comprises:

means to increase a speed of rotation of the vibration drum relative to a speed of rotation of the drive shaft.

Preferably, the means to reduce a propagation of vibrations from the vibration drum to the drive shaft comprises a flexible coupling disposed between the vibration drum and the drive shaft;

the flexible coupling being configured to absorb vibrations.

Preferably, the means to increase a speed of rotation of the vibration drum relative to a speed of rotation of the drive shaft comprises step-up gearing.

Alternatively, the means to increase a speed of rotation of the vibration drum relative to a speed of rotation of the drive. shaft comprises a drive belt.

Preferably, the vibration drum further comprises:

a vibration shaft configured to rotate about a main axis in response to a rotation of the drive shaft; and an offset weight attached to the vibration shaft, wherein the offset weight is configured to impart a vibration to the vibration drum in response to a rotation of the vibration shaft.

Preferably, said vibration drum is releasably affixable to said cassette.

According to a third aspect, there is provided apparatus for treating grass comprising:

a grass treatment unit configured to be affixed to a grass treatment machine;

a cassette, said cassette comprising a grass treating device, said grass treating device configured to rotate in response to a rotation of a drive shaft, said drive shaft being connected to a drive motor located at said grass treatment machine;

said grass treatment unit comprising means to releasably mount said cassette on said grass treatment unit;

said grass treating device being selected from a set of grass treating devices, at least one of the set of grass treating devices comprising a vibration drum.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well-known methods and structures have not been described in detail so as not to unnecessarily obscure the description.

Figure 1:
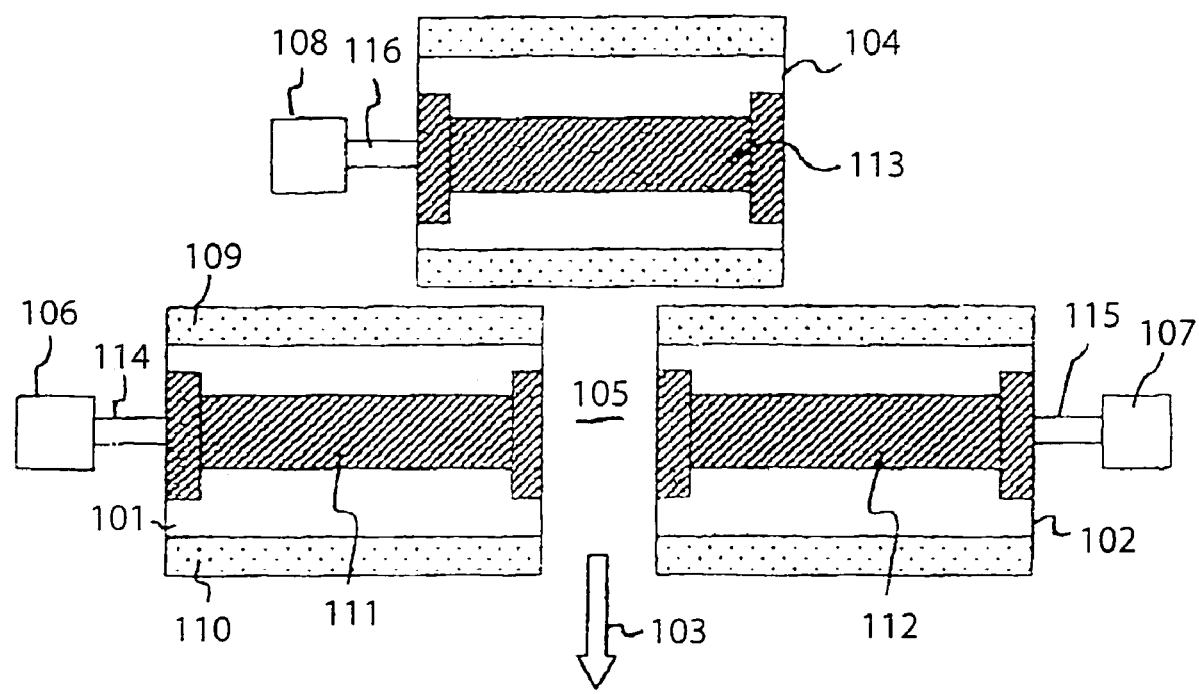
FIG. 1 illustrates schematically a plan view of the layout of the grass treatment units of a prior art triple mower.
Figure 2:
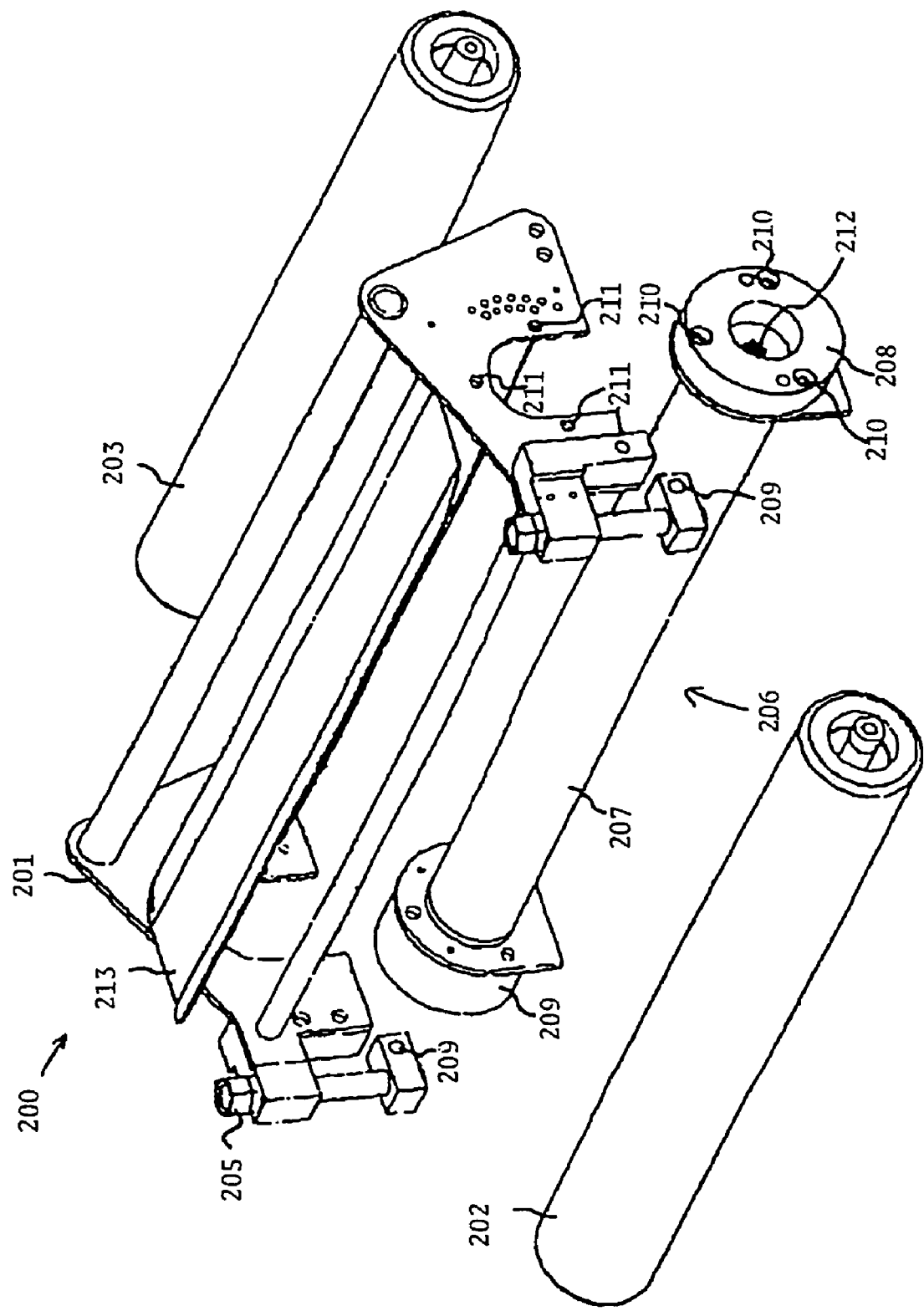
FIG. 2 illustrates schematically an exploded perspective view of a grass treatment unit according to a first specific embodiment.

Referring to FIG. 2 herein, there is illustrated schematically an exploded perspective view of a grass treatment unit according to a first specific embodiment.

The grass treatment unit 200 comprises a housing 201, a first roller 202 and a second roller 203. Each roller 202, 203 is substantially cylindrical in shape and is configured to rotate about its main axis.

The housing 201 comprises first roller attachment points 204 for attaching the first roller 202 to the housing 201 such that the first roller 202 can rotate about its main axis. The housing 201 also comprises second roller attachment points for attaching the second roller 203 to the housing 201 such that the second roller 203 can rotate about its main axis.

The housing 201 also comprises a first roller height adjustment mechanism 205 located close to each first roller attachment point 204. The first roller height adjustment mechanism 205 is used to adjust the height of the first roller when in use. By adjusting the height of the first roller 202, the height of a grass treatment device relative to a grass surface can be adjusted. This is useful for controlling, for example, the height of mowing, the depth of scarification or the depth of spiking.

The first roller height adjustment mechanism 205 comprises a threaded bolt and a nut configured to raise or lower the first roller attachment point 204 as required by the turf manager.

A vibration drum cassette 206 is also provided. The vibration drum cassette 206 comprises a vibration drum 207, a first end 208 and a second end 209. The first end 208 comprises attachment points 210 configured to correspond with cassette attachment points 211 located on the housing 201. The second end 209 has similar attachment points. The vibration drum cassette 206 can be releasably attached to the housing 201 by lining up the attachment point 210 on the cassette with the cassette attachment points 211 located on the housing 201, and passing attachment means such as a threaded bolt through the attachment points 210, 211.

The vibration drum cassette 206 further comprises means 212 to co-operate with a drive shaft 114 from a drive motor 106. Any suitable means can be used, such as a mechanical keying mechanism wherein the drive shaft 114 co-operates with the vibration drum 207.

The housing 201 further comprises a deflection plate 213. Where the housing is used to house a mower cassette or a scarification cassette, or any other type of grass treatment device that may give rise to particulate matter being removed from the grass surface, the particulate matter is thrown against the deflection plate 213 and directed towards a collection unit (not shown).

Figure 3:
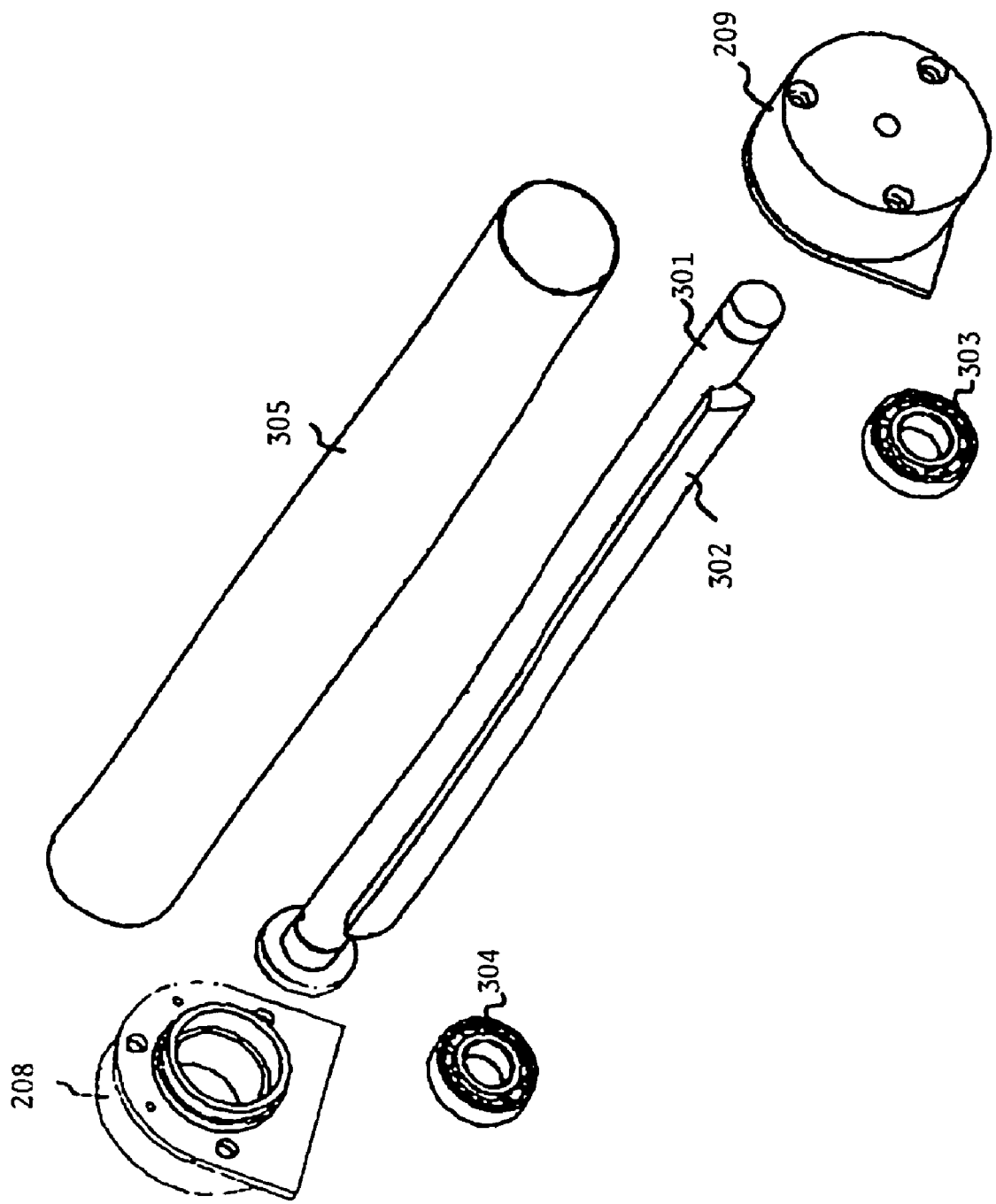
FIG. 3 illustrates schematically an exploded perspective view of a vibration mechanism of a vibration drum cassette.

FIG. 3 illustrates schematically an exploded perspective view of a vibration mechanism of a vibration drum cassette 206. The vibration drum cassette 206 comprises a vibration shaft 301 and an offset weight 302. The vibration shaft 301 is disposed between the first end 208 and the second end 209 of the vibration cassette 206. The offset weight 302 is disposed on the vibration shaft 301. The vibration drum further comprises a pair of bearings 303, 304 provided to ensure smooth rotation of the vibration shaft, and a vibration shaft cover 305 comprising a hollow cylinder provided to surround the vibration shaft 301 and isolate the When the drive shaft 114 is connected to the means 212 to co-operate with a drive shaft 114, and the drive shaft 114 is rotated, the vibration shaft 301 rotates correspondingly. Because the vibration shaft 301 comprises an offset weight 302, the offset weight 302 provides a centrifugal force on the vibration shaft 301 as the vibration shaft 301 rotates. This centrifugal force causes the vibration shaft 301 to vibrate with a frequency related to the speed of rotation of. the drive shaft 114.

The vibration drum cassette 206 further comprises gearing means (not shown) to increase the speed of rotation of the vibration shaft 301 from around 2,500 rpm as provided by the drive shaft 114 to around 5,000 rpm. Gearing means can be incorporated in the first end 208 of the vibration drum cassette 206 between the drive shaft 114 and the vibration shaft 301. The gearing means may include step-up gearing or a drive belt, or any other system by which the speed of rotation of the drive shaft 114 can be increased when transmitted to the vibration shaft 301.

Figure 4:
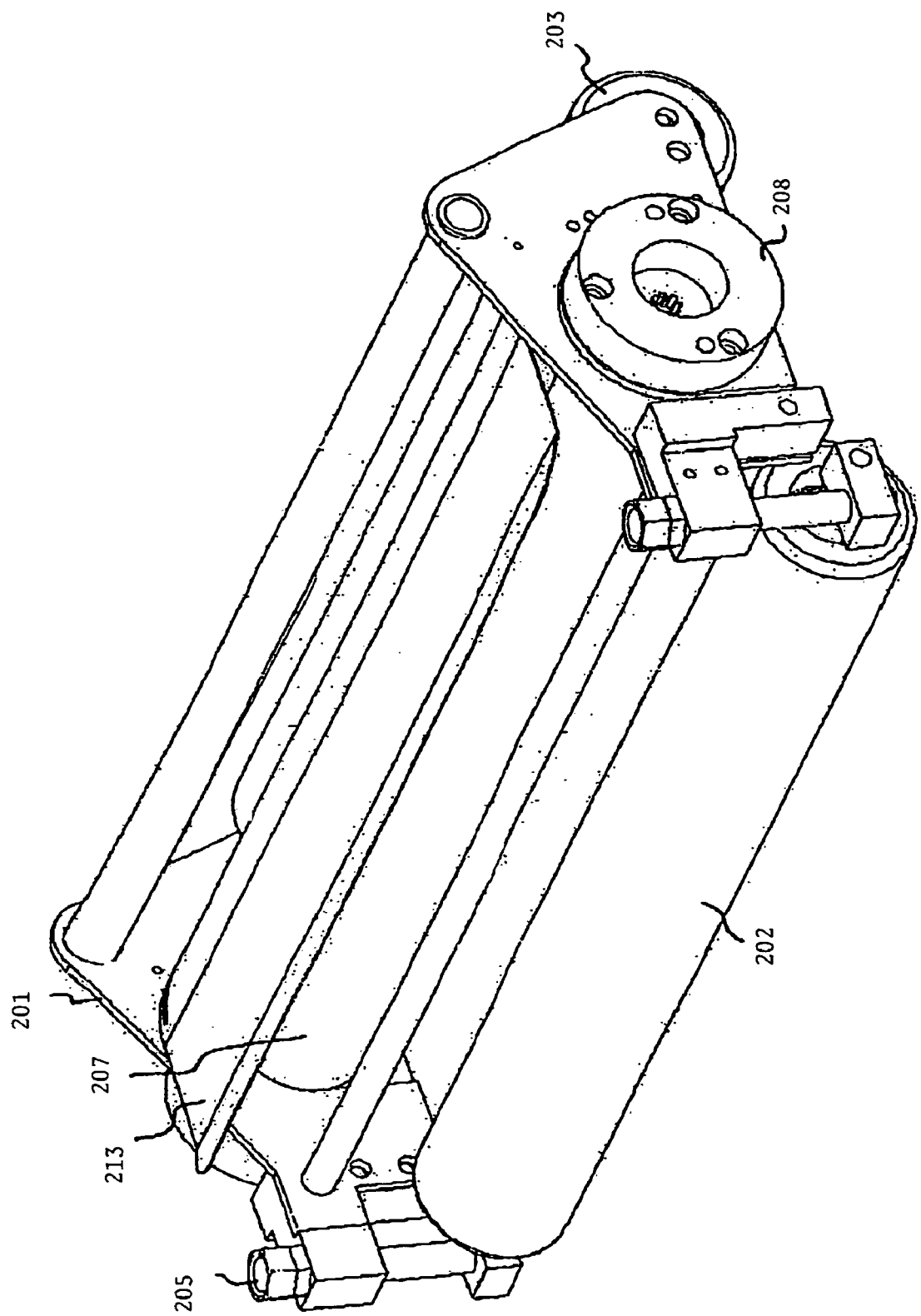
FIG. 4 illustrates schematically an assembled perspective view of the grass treatment unit according to the first specific embodiment.

FIG. 4 illustrates schematically an assembled perspective view of the grass treatment unit according to the first specific embodiment. In use, the only parts of the grass treatment unit that are in direct contact with the grass surface are the first roller 202 and the second roller 203. The vibration drum, unlike the prior art vibration roller that cannot be incorporated into a cassette, does not come into direct contact with the ground.

In use, the vibration drum 207 is connected to the drive shaft 114. The rotation of the drive shaft 114 causes vibration of the vibration drum as explained above. Unlike the prior art vibration roller that cannot be incorporated into a cassette, the vibrations from the vibration drum 207 are not damped to reduce vibrations being propagated into the housing 201. Instead, vibrations from the vibration drum are propagated through the housing 201 and into the first roller 202 and the second roller. In this way, the first roller 202 and the second roller 203 that are in contact with the ground are caused to vibrate as they roll over a grass surface.

By propagating vibrations through the first roller 202 and the second roller 203, each grass treatment unit effectively comprises two vibration rollers. Therefore each rolling pass of the grass treatment machine effectively gives two rolling passes; one from the first roller 202 and one from the second roller 203.

Figure 5:
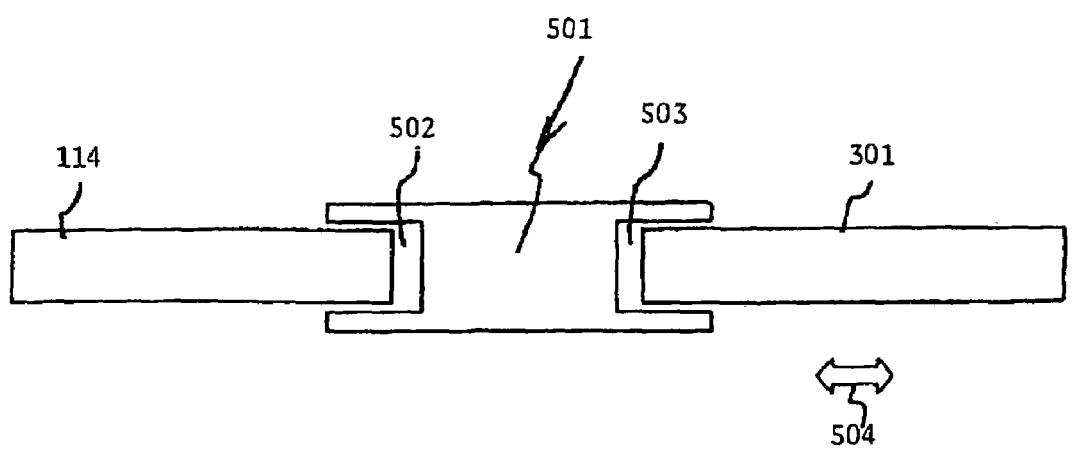
FIG. 5 illustrates schematically a cross-section side elevation view of a flexible coupling.

If the above system were to be incorporated into an existing cassette mechanism, vibrations from the vibration drum cassette 206, then vibrations from the vibration drum cassette 206 would also propagate into the drive shaft 114 and into the motor 106, potentially causing damage to the motor. Referring to FIG. 5 herein, there is illustrates schematically a cross-section side elevation view of a flexible coupling 501. The flexible coupling 501 is used to transmit rotational movement from the drive shaft 114 to the vibration shaft 301.

The flexible coupling 501 is disposed between the drive shaft 114 and the vibration shaft 301. The drive shaft 114 co-operates with a first end of the flexible coupling 501 such that a rotation of the drive shaft 14 causes a corresponding rotation of the flexible coupling 501. Similarly, the vibration shaft 301 co-operates with a second end of the flexible coupling 501 such that a rotation of the flexible coupling 501 causes a corresponding rotation of the vibration shaft 301.

The flexible coupling 501 comprises means to damp vibrations. It may comprise, for example, a material with mechanical properties that absorb vibrations. Vibrations 504 from the vibration shaft 301 are therefore partially absorbed by the flexible coupling 501, and propagation of vibrations from the vibration shaft 301 to the drive shaft 114 is greatly reduced. In this way, the risk of damage to the drive shaft 114 or drive motor 106 caused by vibration of the vibration shaft 301 is greatly reduced.

A further advantage of the vibration drum cassette 206 is that cassettes can be provided with different offset weights. By altering the offset weight used, different amplitudes of vibration can be obtained. This is advantageous for vibration rolling of grass under different conditions.

To illustrate how the grass treatment unit 200 can be used with other types of grass treatment device, there will be described a grass treatment unit comprising a scarification device.

Figure 6:
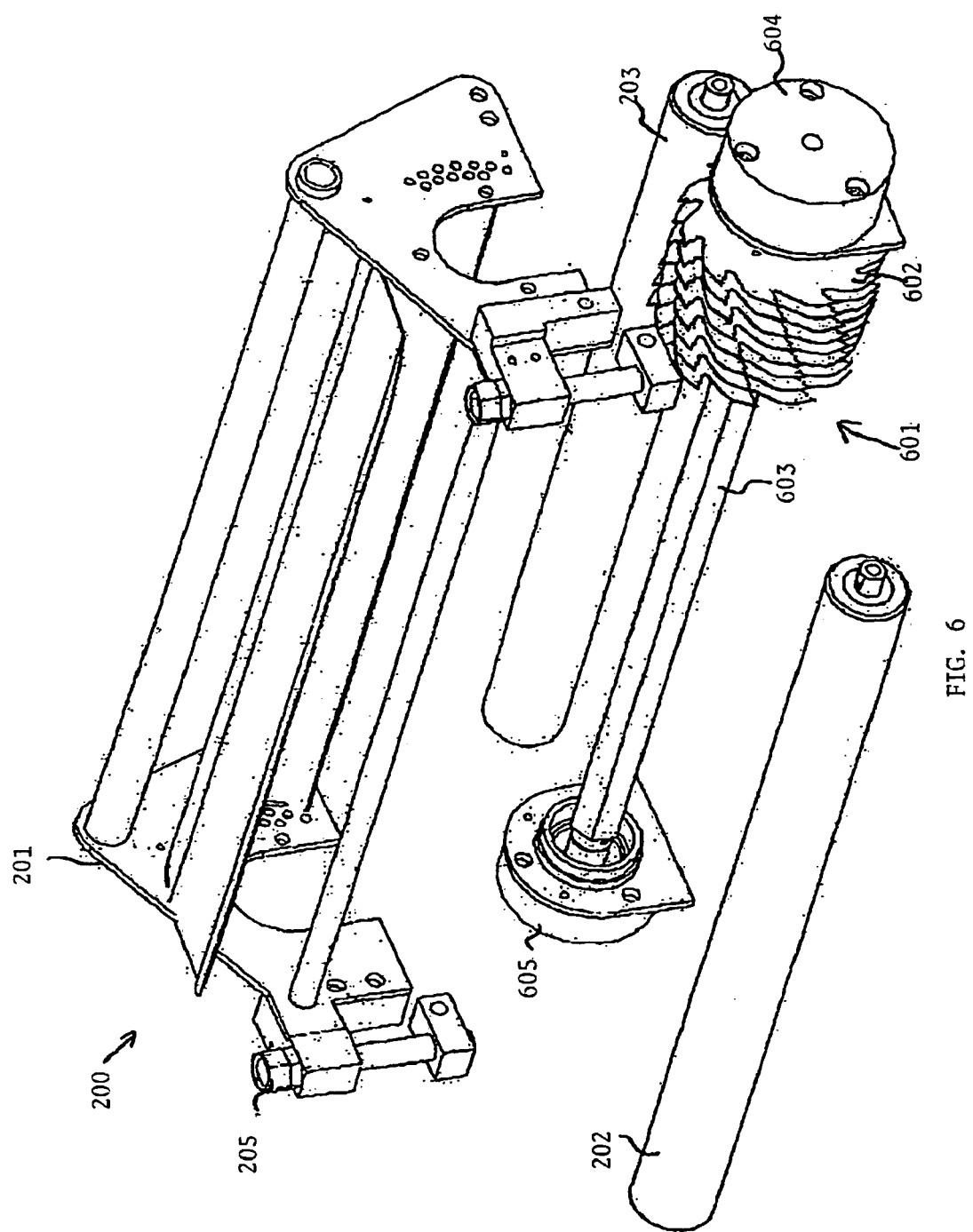
FIG. 6 illustrates schematically an exploded perspective view of a grass treatment unit comprising a scarification grass treatment device.

Referring to FIG. 6 herein, there is illustrated schematically an exploded perspective view of a grass treatment unit comprising a scarification grass treatment device. Most of the components have already been referred to above. The grass treatment unit 200 comprises the housing 201, the first roller 202 and the second roller 203. In addition, a scarification cassette 601 comprising a scarification device is provided A scarification device (sometimes referred to as a verticutter) comprises a series of blades 602 (only a section of blades are shown for clarity) having a width of 2 to 3 mm with a gap of 7 to 15 mm between them. The blades 602 are disposed substantially perpendicular to the grass surface and so can cut into the grass surface to a desired depth. Scarification is used to remove thatch that may have built up on a grass surface.

The blades 602 are mounted on a shaft 603 that is disposed between a first scarification cassette end 604 and a second scarification cassette end 605. The drive shaft 114 co-operates with the shaft 603 to effect rotation of the shaft 603 when in use. As the shaft rotates 603, the blades 602 rotate correspondingly and cut into the grass surface.

Figure 7:
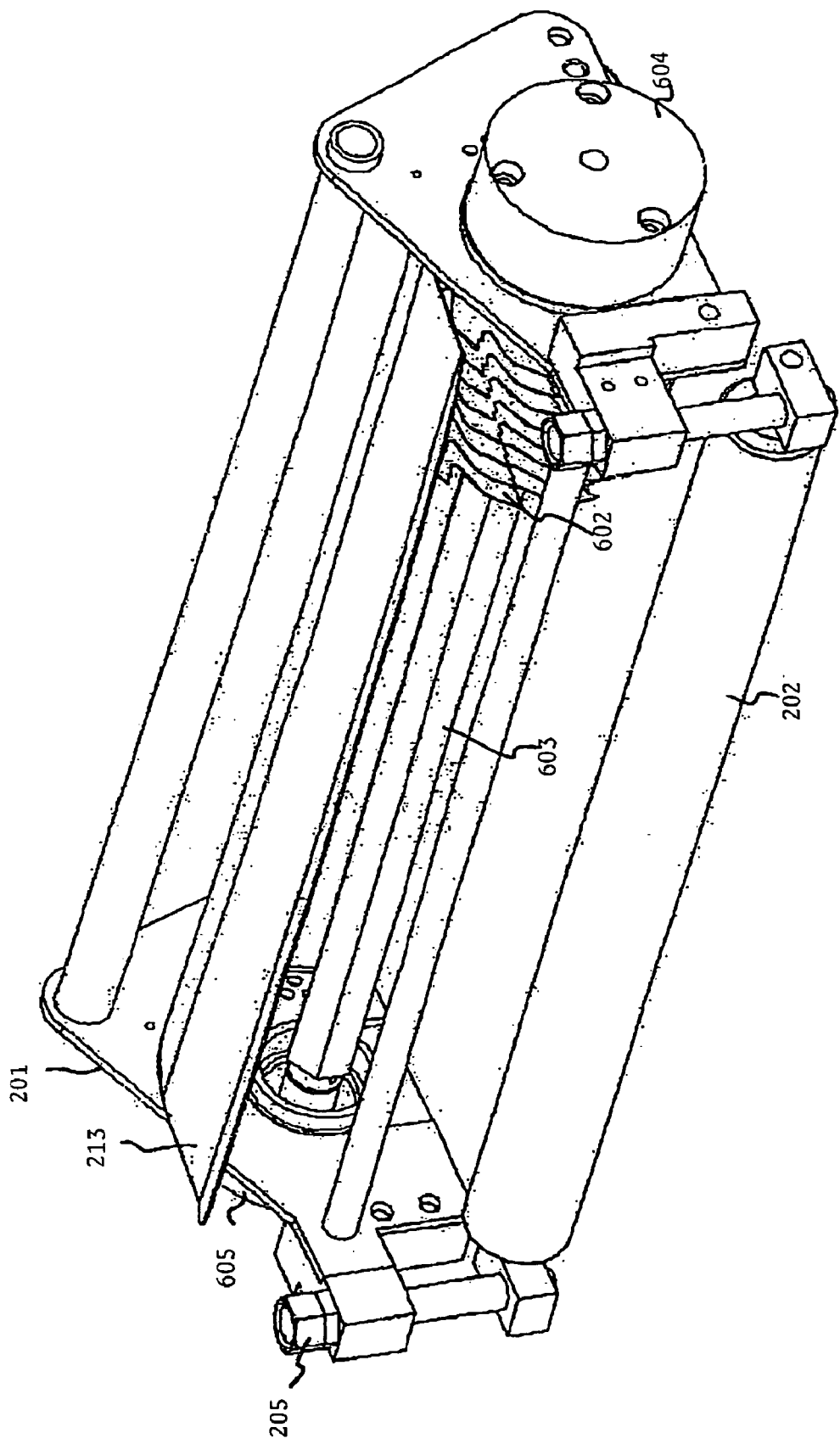
FIG. 7 illustrates schematically an assembled perspective view of a grass treatment unit comprising a scarification grass treatment device.

Referring to FIG. 7 herein, there is illustrated schematically an assembled perspective view of a grass treatment unit comprising a scarification grass treatment device. Unlike the grass treatment unit housing a vibration drum cassette 206, the scarification cassette 601 is in contact with the grass surface. The first roller 202 and the second roller 203 are disposed in front of and behind the scarification cassette 601 respectively. The rollers 202, 203 perform the functions of smoothing the grass surface to be treated and maintaining a steady height of the scarification cassette 601 above the grass surface. Further, the first roller height adjustment mechanism 205 can be used to adjust the height of the first roller 202 which has the effect of adjusting the height of the scarification cassette 601 above the grass surface. In this way, the depth of scarification by the blades 602 can be controlled.

Figure 8:
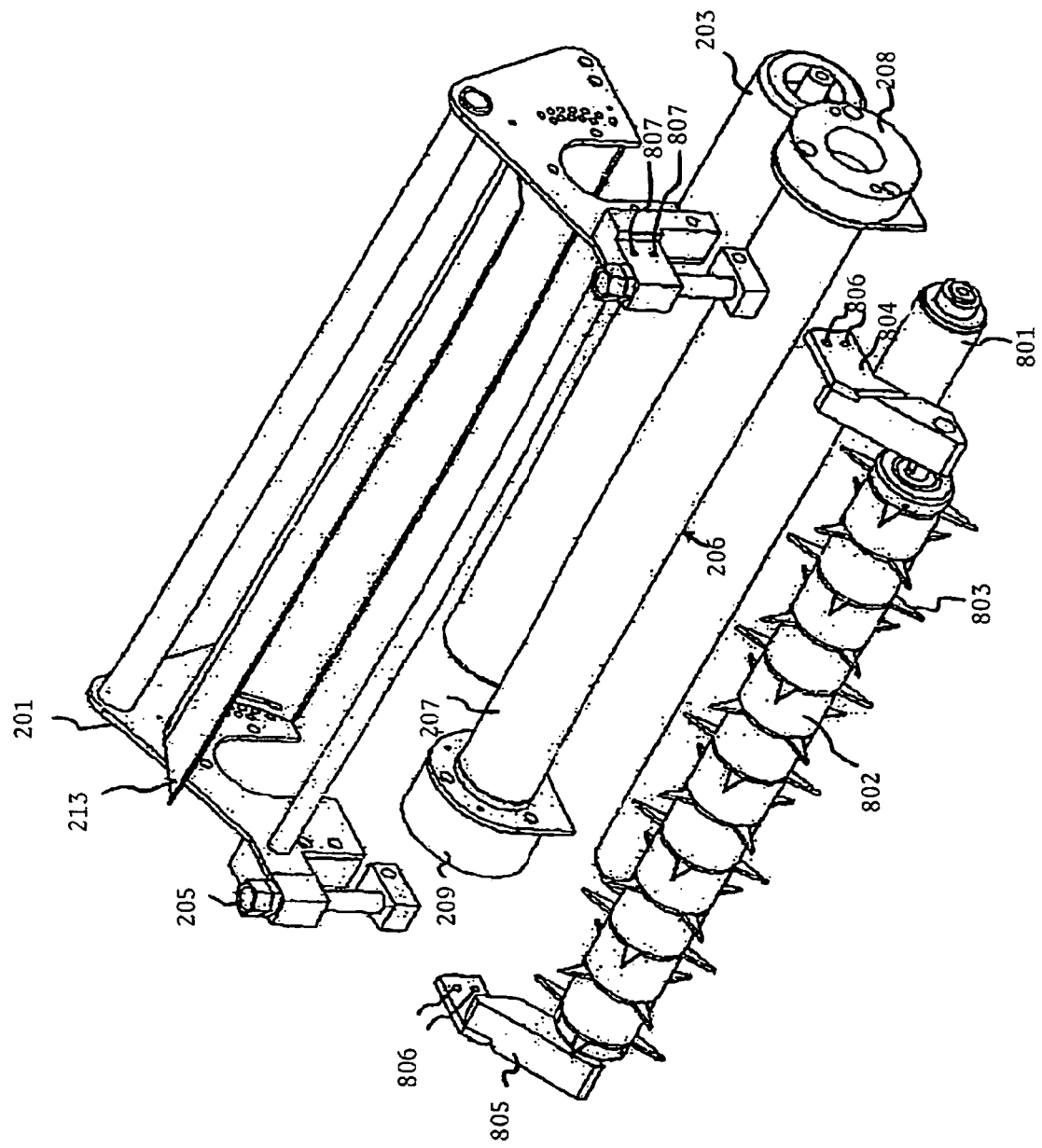
FIG. 8 illustrates schematically an exploded perspective view of a grass treatment unit comprising a vibration drum cassette and a spiking roller according to a second specific embodiment.

In a second specific embodiment, an additional spiking attachment is provided disposed in front of the first roller relative to the direction of travel of the grass treatment machine. Referring to FIG. 8 herein, there is illustrated schematically an exploded perspective view of a grass treatment unit comprising a vibration drum cassette and a spiking roller according to the second specific embodiment.

The grass treatment unit comprises a housing 201, a second roller 203, and a first roller 801. The first roller 801 according to the second specific embodiment. comprises a cylindrical roller of a smaller radius than the first roller 202 according to the first specific embodiment. The grass treatment unit further comprises a vibration drum cassette 206 releasably attached to the housing 201 between the first roller 801 and the second roller 203.

The grass treatment unit further comprises a spiking roller 802 disposed in front of the first roller 801 relative to the direction of travel of the grass treatment machine. The radius of the first roller 801 is reduced compared to the radius of the first roller 202 of the first embodiment in order to accommodate the spiking roller 802.

The spiked roller comprises a central shaft about which a plurality of spiking units 803 can rotate. Each spiking unit comprises a set of spikes disposed radially outwards from the shaft. The shaft is disposed between two arms 804, 805. Each arm 804, 805 comprises spiking roller attachment points 806, configured to co-operate with corresponding housing spiking roller attachment points 807 disposed on the housing 201. By lining up the spiking roller attachment points 806 on the arms 804, 805 with the housing spiking roller attachment points 807 on the housing and passing a bolt between them, the spiking roller 802 is releasably attached to the housing 201.

Figure 9:
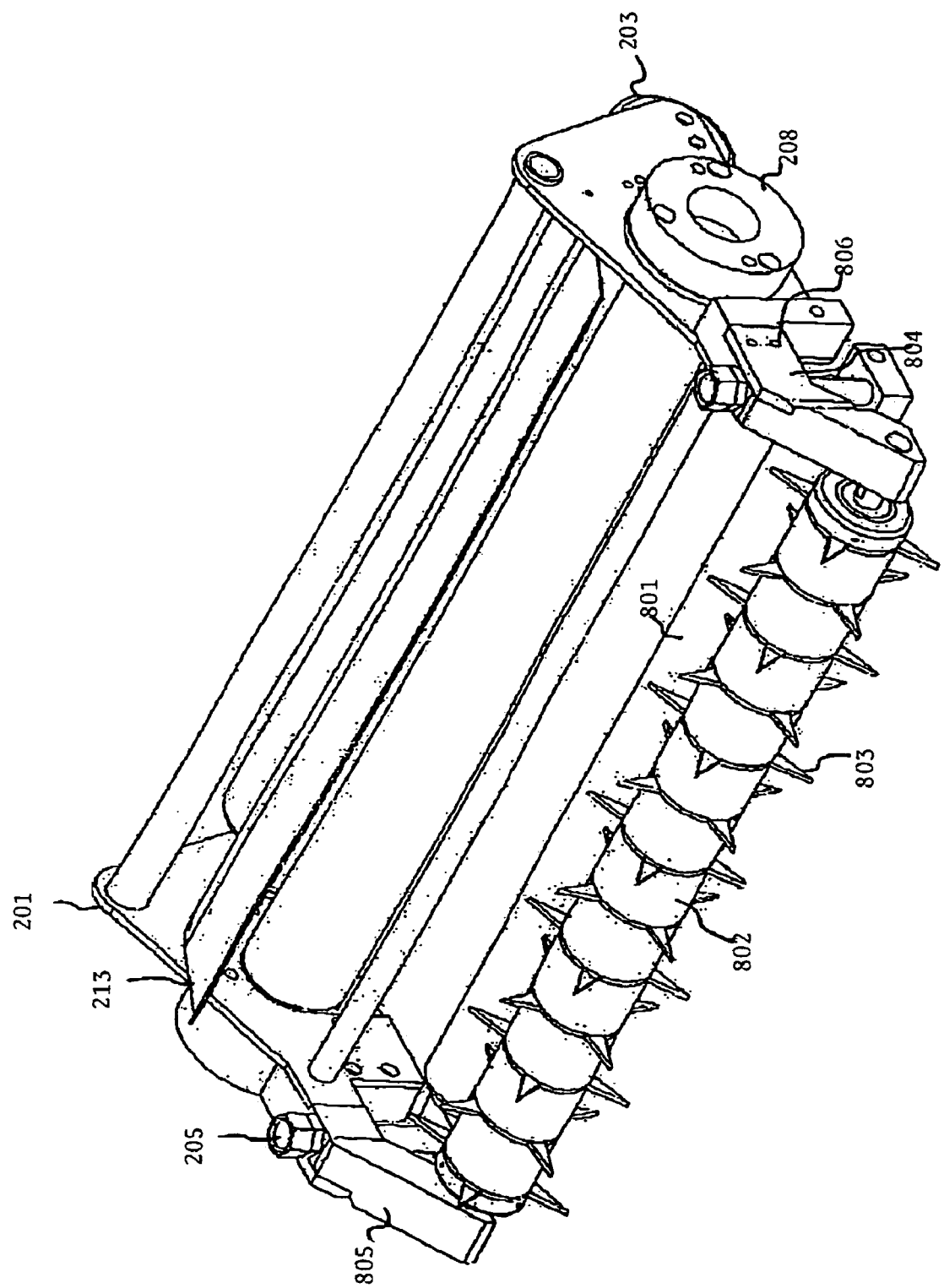
FIG. 9 illustrates schematically an assembled perspective view of a grass treatment unit comprising a vibration drum cassette and a spiking roller according to a second specific embodiment.

Referring to FIG. 9 herein, there is illustrated schematically an assembled perspective view of a grass treatment unit comprising a vibration drum cassette and a spiking roller according to the second specific embodiment. In use, the spikes 803 of the spiking roller 802 enter the grass surface as the spiking roller 802 rolls across the grass surface, The vibration drum cassette 206 vibrates, and the vibrations are propagated through the housing 201 and into the spiking roller 802. The vibrations of the spikes improve the ease with which the spikes can penetrate the grass surface.

As the grass treatment machine moves forward, the first roller 801 and then the second roller 203 pass over the area of grass surface that has just been treated by the spiking roller 802. The vibrations from the vibration drum cassette 206 are propagated through the housing 201 and into the first roller 801 and the second roller 203. In this way, by making one pass of the grass treatment machine over an area of grass surface, the area of grass surface effectively receives three treatments; first it is treated by the spiking roller 802, then it is treated by the first roller 801 that is acting as a vibration roller, then it is treated by the second roller 203 that is also acting as a vibration roller. This is particularly advantageous when treating turf by spreading sand to achieve an even spread of sand.

In all other respects, the second specific embodiment is identical to the first specific embodiment, and can accommodate different cassettes that perform different grass treatment operations such as scarification, brushing and so on.

According to third specific embodiment, the grass treatment unit comprises a single cassette. A plurality of grass treatment devices is provided, that may be selected from the set including a scarifier, a power brush, a vibration drum and a spiking roller. Each of the grass treatment devices can be releasably attached to the cassette.

For example, a grass treatment unit is fitted with a cassette comprising a scarifier. A turf manager then wishes to fit a vibration drum to the grass treatment unit. The cassette is removed from the grass treatment unit, and the scarifier is removed from the cassette. A vibration drum is then affixed to the cassette, and the cassette is fitted to the grass treatment unit. In this way, costs can be kept to a minimum as only a single cassette need be provided. However, it is more convenient for a turf manager to have a cassette for each type of grass treatment device as this allows for easier changing of grass treatment device in the grass treatment unit, and some grass treatment units run on different bearings within the cassette that would also need changing.

In all other respects, the third specific embodiment is compatible with either of the first or second specific embodiments.

The invention claimed is:

1. Apparatus for treating grass comprising:
  a grass treatment unit comprising a housing, said grass treatment unit configured to be affixed to a grass treatment machine;
  a cassette, said cassette comprising a vibration drum that is not comprised as part of a roller, said vibration drum configured to rotate in response to a rotation of a drive shaft, said drive shaft being connected to a drive motor located at said grass treatment machine;
  said grass treatment unit comprising means to releasably mount said cassette at said grass treatment unit;

said cassette further comprises means to reduce a propagation of vibrations from said vibration drum to said drive shaft; and wherein said vibration drum is configured to specifically propagate vibrations thereby generated through said housing.

2. Apparatus for treating grass as claimed in claim 1 wherein said cassette further comprises: means to increase a speed of rotation of said vibration drum relative to a speed of rotation of said drive shaft.

3. Apparatus for treating grass as claimed in claim 1 wherein said means to reduce a propagation of vibrations from said vibration drum to said drive shaft comprises a flexible coupling disposed between said vibration drum and said drive shaft; and said flexible coupling being configured to absorb vibrations.

4. Apparatus for treating grass as claimed in claim 2 wherein said means to increase a speed of rotation of said vibration drum relative to a speed of rotation of said drive shaft comprises step-up gearing.

5. Apparatus for treating grass as claimed in claim 2 wherein said means to increase a speed of rotation of said vibration drum relative to a speed of rotation of said drive shaft comprises a drive belt.

6. Apparatus for treating grass as claimed in claim 1 wherein said grass treatment unit comprises:
  a first roller disposed towards the front of said grass treatment unit relative to a direction of motion; and
  a second roller disposed towards the rear of said grass treatment unit relative to a direction of motion, wherein said cassette is configured to be mounted at said grass treatment unit disposed between said first roller and said second roller.

7. Apparatus for treating grass as claimed in claim 6 wherein said grass treatment unit comprises: means to adjust a height of said first roller relative to said second roller.

8. Apparatus for treating grass as claimed in claim 7 wherein said means to adjust the height of said first roller relative to said second roller comprises a threaded bolt.

9. Apparatus for treating grass as claimed in claim 6 further comprising:
  a spiking roller comprising a spiking roller shaft; and
  a set of spikes disposed on said spiking roller shaft and extending radially outwards from said spiking roller shaft, said spikes being configured to rotate about said spiking roller shaft; and
  means to releasably mount said spiking roller on said grass treatment unit, at a location forward of said first roller relative to a direction of motion.

10. Apparatus for treating grass as claimed in claim 1 wherein said vibration drum further comprises:
  a vibration shaft configured to rotate about a main axis in response to a rotation of said drive shaft; and
  an offset weight attached to said vibration shaft, wherein said offset weight is configured to impart a vibration to said vibration drum in response to a rotation of said vibration shaft.

11. A cassette configured to be releasably attached to a housing of grass treatment unit having at least one roller affixed to said housing, said cassette comprising:

a vibration drum separate and apart from the at least one roller, said vibration drum configured to rotate in response to a rotation of a drive shaft, said drive shaft being connected to a drive motor located at a grass treatment machine, wherein said vibration drum is configured to specifically propagate vibrations thereby generated through said housing and through the at least one roller via said housing; and means to reduce a propagation of vibrations from said vibration drum to said drive shaft.

12. The cassette configured to be releasably attached to the grass treatment unit as claimed in claim 11 wherein said cassette further comprises: means to increase a speed of rotation of said vibration drum relative to a speed of rotation of said drive shaft.

13. The cassette configured to be releasably attached to the grass treatment unit as claimed in claim 11 wherein said means to reduce a propagation of vibrations from said vibration drum to said drive shaft comprises a flexible coupling disposed between said vibration drum and said drive shaft; and said flexible coupling being configured to absorb vibrations.

14. The cassette configured to be releasably attached to the grass treatment unit as claimed in claim 12 wherein said means to increase a speed of rotation of said vibration drum relative to a speed of rotation of said drive shaft comprises step-up gearing.

15. The cassette configured to be releasably attached to the grass treatment unit as claimed in claim 12 wherein said means to increase a speed of rotation of said vibration drum relative to a speed of rotation of said drive shaft comprises a drive belt.

16. The cassette configured to be releasably attached to the grass treatment unit as claimed in claim 11 wherein said vibration drum further comprises:
  a vibration shaft configured to rotate about a main axis in response to a rotation of said drive shaft; and
  an offset weight attached to said vibration shaft, wherein said offset weight is configured to impart a vibration to said vibration drum in response to a rotation of said vibration shaft.

17. Apparatus for treating grass comprising:
  a grass treatment unit configured to be affixed to a grass treatment machine, said grass treatment unit having a housing;
  said housing having at least one roller affixed thereto;
  a cassette, said cassette comprising a grass treating device, said grass treating device configured to rotate in response to a rotation of a drive shaft, said drive shaft being connected to a drive motor located at said grass treatment machine;
  said grass treatment unit comprising means to releasably mount said cassette on said grass treatment unit; and
  said grass treatment device being selected from a set of said grass treating devices, at least one of said set of said grass treating devices comprising a vibration drum separate and apart from the at least one roller, wherein said vibration drum is configured to specifically propagate vibrations thereby generated through said housing.

* * * * *